Figure 1:
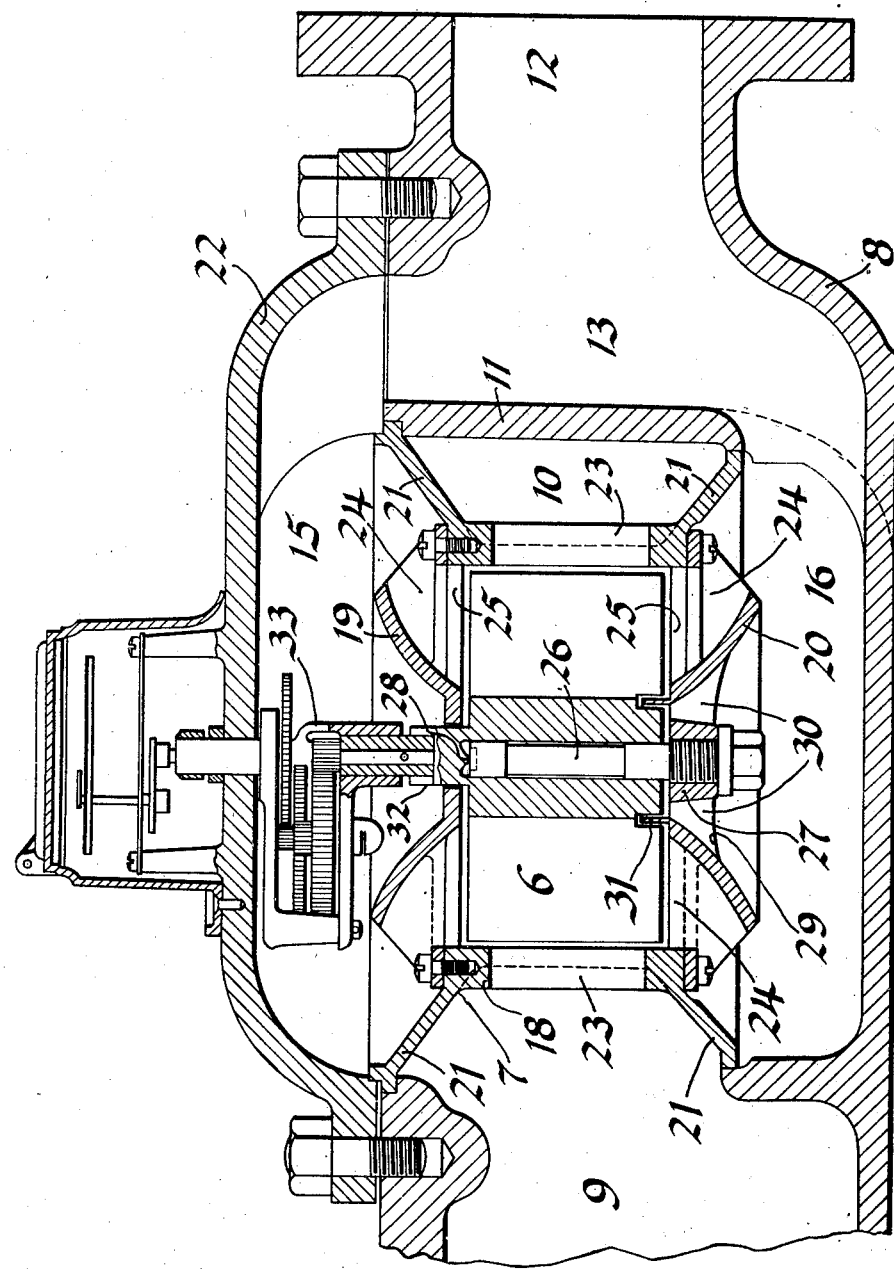

H. CHRISMAN.
WATER METER.
APPLICATION FILED MAR. 14, 1908.

1,094,058.

Patented Apr. 21, 1914.
3 SHEETS—SHEET 1.

WITNESSES:

INVENTOR.
Horace Chrisman
BY
his ATTORNEY IN FACT.

H. CHRISMAN.
WATER METER.
APPLICATION FILED MAR. 14, 1908.

1,094,058.

Patented Apr. 21, 1914.

3 SHEETS—SHEET 3.

WITNESSES:

INVENTOR.

BY his, ATTORNEY IN FACT.

ＵNITED STATES PATENT OFFICE.

HORACE CHRISMAN, OF EDGEWOOD PARK, PENNSYLVANIA, ASSIGNOR TO PITTSBURG METER COMPANY, A CORPORATION OF PENNSYLVANIA.

WATER-METER.

1,094,058.

Specification of Letters Patent. Patented Apr. 21, 1914.

Application filed March 14, 1908. Serial No. 421,163.

*To all whom it may concern:*

Be it known that I, HORACE CHRISMAN, a citizen of the United States, and a resident of Edgewood Park, in the county of Allegheny and State of Pennsylvania, have made a new and useful Invention in Water-Meters, of which the following is a specification.

This invention relates to water meters and more particularly to the type of meters provided with a wing wheel driven by the water traversing the passages of the meter which operates the indicating and registering mechanism of the meter.

An object of this invention is the production of a meter in which the static and dynamic thrusts on the wing wheel of the meter are counterbalanced. This and other objects I attain in a meter embodying the features hereinafter described and illustrated in the drawings which accompany this application and form a part thereof.

Figure 2:
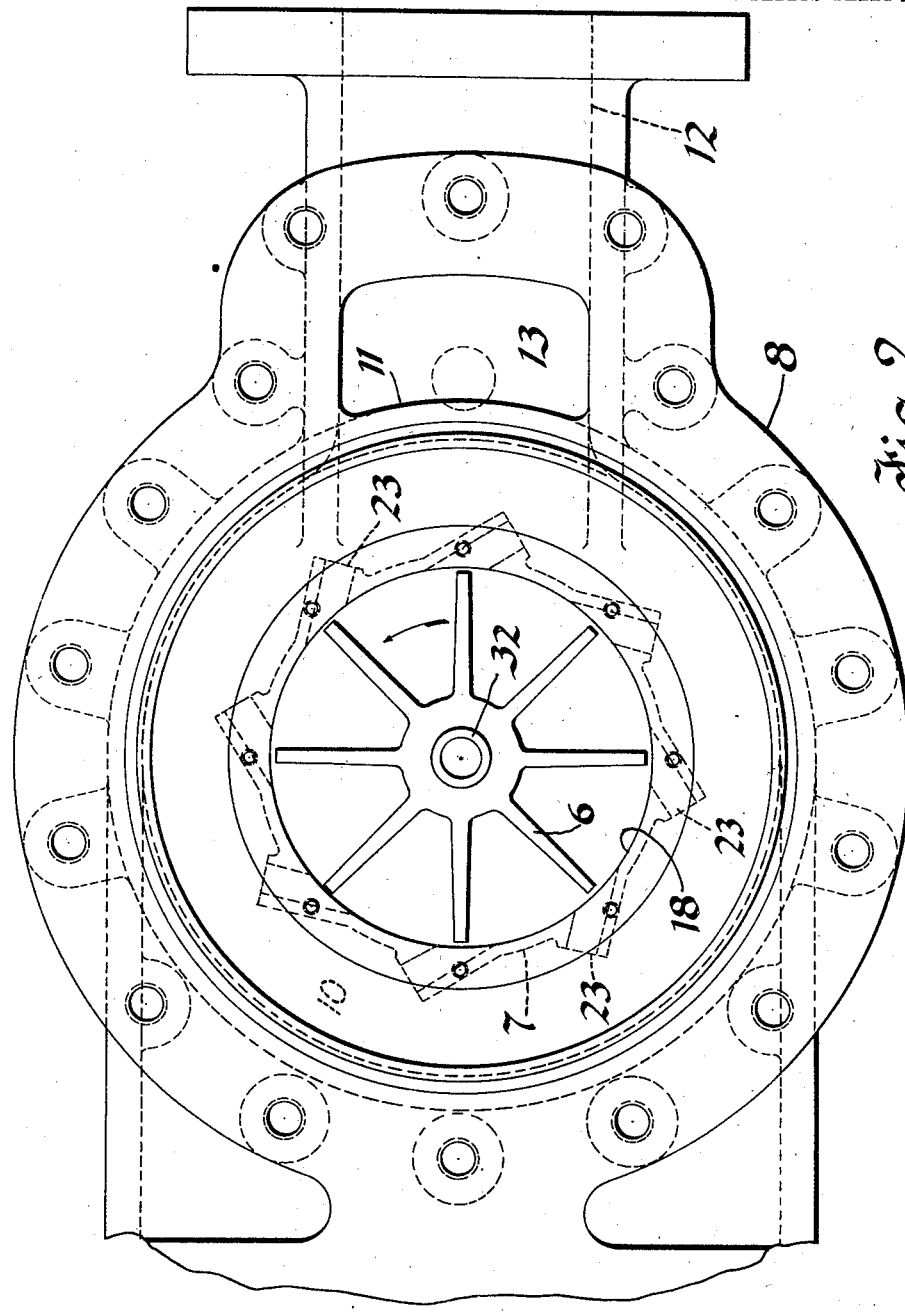
Figure 3:
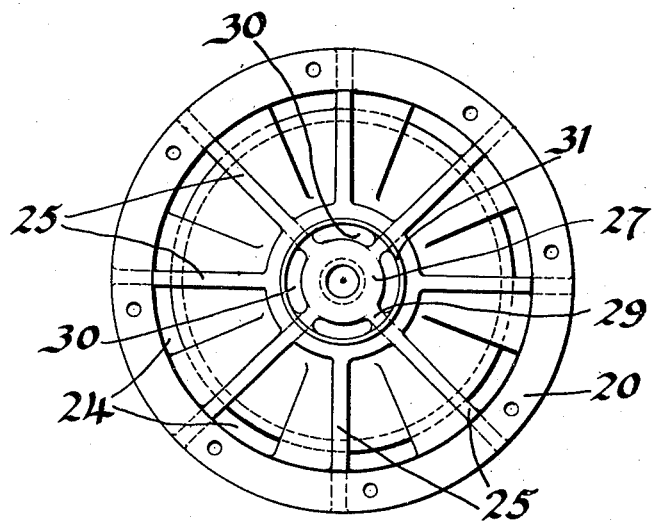
Figure 4:
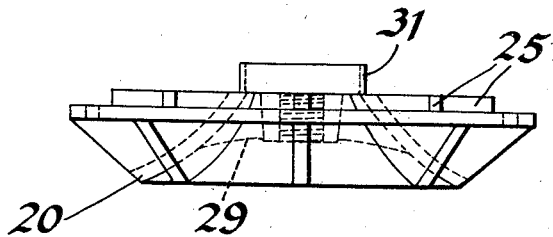

In the drawings: Figure 1 is a longitudinal section of a meter embodying my invention, a portion being removed and a portion broken away for convenience of illustration; Fig. 2 is a plan view of the meter shown in Fig. 1 with the top and other portions removed; and, Figs. 3 and 4 are respectively plan and side elevations of a detail of my invention.

All meters known to me are so constructed that the static pressure of the water passing through the meter causes a preponderating longitudinal thrust in one direction on the wing wheel of the meter. This thrust either causes the wing wheel to float off its bearing or causes it to be held upon its bearing by too great a pressure. In the embodiment of my invention illustrated in the drawings, I have so arranged the delivery passages serving the wing wheel that the dynamic thrusts on the wheel are counterbalanced and I have also provided means for counterbalancing the longitudinal or axial thrust on the wheel occasioned by the static pressure of the water within the meter passages so that the wheel is balanced with respect to the opposing water pressures and held upon its bearing by a suitable slight pressure.

In the meter disclosed in the drawings, a wing wheel 6 is rotatably mounted within a wheel casing 7, which in turn is mounted within an outer casing 8. The outer casing is provided with a water inlet port (not shown) which communicates through a passage 9, with an annular passage 10, surrounding the wheel casing and formed between it and a coöperating diaphragm 11 formed integrally with the casing 8. An outlet port 12 is provided in the outer casing 8 and communicates, through a passage 13, with passages 15 and 16, formed within the casing and respectively located above and below the wheel casing.

The wheel casing 7 consists of a cylindrical portion 18 and top and bottom portions 19 and 20. The cylindrical portion is provided with annular flanges 21 supported on shoulders formed on the diaphragm 11 and which coöperate, in securing the wheel casing 7 in place, with a cover 22, secured by suitable bolts to the casing 8. A plurality of ports 23 extend through the cylindrical portion of the casing 7 and deliver water from the annular passage 10 to the interior of the casing and consequently to the blades of the wing wheel 6.

The top and bottom portions 19 and 20 are each provided with a plurality of ports 24 so proportioned, relative to the combined area of the inlet ports 23, that the water delivered to the wing wheel is divided into two streams, one of which is discharged through the ports of the top portion 19 and the other of which is discharged through the ports of the bottom portion 20. The ports in the top portion 19 communicate with the delivery passage 15 and the ports of the bottom portion communicate with the delivery passage 16.

Two sets of radially-extending retarding vanes 25 one formed integrally with the top portion and one with the bottom portion are located between the wing wheel and the outlet ports for the wheel casing. These vanes are so positioned and arranged that they cause eddy currents within the casing 7 during the operation of the meter which tend to retard the wing wheel. Under ordinary conditions the wheel tends to move faster, in proportion to the amount of water passing through the meter, for heavy loads than for light loads since the retarding resistance, which ordinarily is only the mechanical inefficiency of the apparatus, remains constant while the accelerating forces increase as the flow of water through the meter increases. With the retarding vanes located as illustrated, the effect of the eddy currents created by the retarding vanes increases in approximately a direct ratio with the increase of flow through the meter and consequently the retarding force imposed upon the wing wheel increases as the accelerating forces of the wing wheel increase and the tendency of the meter to over-register for heavy flows of water is overcome.

The wing wheel is rotatably mounted on a pivot shaft 26 which is threaded into a collar 27 and which extends upwardly through the hub portion of the wing wheel and forms a bearing for a pivot point 28 formed integrally with the wing wheel. The collar 27 is supported by radially-extending webs 29 formed integrally with the bottom portion 20 of the wheel casing. This construction provides ports 30 between the collar 27 and the bottom portion 20 and exposes the lower end of the hub of the wing wheel to the pressure of the water in the outlet passage 16. An annular flange 31 is formed integrally with the bottom portion 20 and, extending upwardly, surrounds the lower end of the hub portion and to some extent resists the flow of water from the interior of the casing 7 through the ports 30 and into the chamber 16.

The upper end of the hub portion of the wing wheel is provided with a projection 32 which extends through a suitable opening formed in the top portion 19 and which engages, through the agency of a suitable driving connection, an operating shaft of an indicating apparatus 33 secured to the cover portion 22 of the casing 8. If the bottom portion 20 of the casing were not provided with the ports 30 the wing wheel would, under the influence of the preponderating upward thrust occasioned by the water pressure existing within the casing 7, tend to float off of its bearing. By providing the ports 30 and exposing the lower face of the hub of the wing wheel to the water pressure of the passage 16 this difficulty is overcome and the wing wheel is subjected to a downward thrust which is sufficient to hold it in place on its bearing with sufficient force to produce the best results in operation. The areas of the upper end of the hub portion exposed to the water pressure within the casing 7 and the pressure within the passage 15 may be so proportioned that the longitudinal or static pressure of the water of the passage 16 will be sufficient to overcome to the desired extent both the weight of the wing wheel and the downward thrust occasioned by the static pressure of the water within the wheel casing.

The operation of the meter is as follows: Water, delivered to the meter through the inlet port, is conveyed to the annular passage 10 by the passage 9. The ports 23 discharge water onto the blades of the wing wheel 6 in such a way that the wing wheel is caused to rotate in the direction of the arrow, Fig. 2. The water delivered to the wing wheel is divided in its passage through the wheel casing in two streams and is discharged by ports 24 provided in the top and bottom portions of the wheel casing to the respective passages 15 and 16, from which it is delivered, through the passage 13, to the outlet port 12 of the casing 8.

With this construction, the dynamic and static thrusts on the wing wheel are utilized to obtain a running balance of the wheel.

The inlet ports 23 of the casing 7 deliver the water traversing the meter to all sides of the wing wheel and consequently the sidewise or lateral thrusts on the wheel occasioned by the impinging force of the water are counterbalanced. By locating the outlet ports 24 at each end of the wheel casing, the longitudinal dynamic forces acting on the wing wheel are substantially counterbalanced, since there is no more tendency for the water to leave one than the other set of ports. The ports 30 in the bottom portion 20 of the casing provide means for substantially counterbalancing the longitudinal thrusts on the wing wheel occasioned by the static pressure of the water within the casing, and the arrangement may be such that the wheel is balanced both for weight and water pressure, or it may be nearly balanced so that it is held against its bearing with just the proper pressure.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. In a water meter, a wheel casing provided with peripherally disposed inlet ports, outlet ports, and retarding means located adjacent to said outlet ports, an outer casing provided with inlet and outlet ports, a wheel located within said wheel casing and provided with a hub of relatively large diameter and means provided with apertures whereby the lower face of said hub is subjected to a pressure less than the pressure within the wheel casing.

2. In a water meter, a wheel casing provided with peripherally disposed inlet ports, and outlet ports in the top and bottom, a wheel within said casing provided with a hollow hub portion, a bearing post extending into said hub portion, a bearing for said wheel located adjacent to the top of said post and means provided with apertures whereby the lower face of said hub is subjected to a pressure less than the pressure within the casing.

3. In a water meter, a wheel casing provided with peripherally disposed inlet ports, and outlet ports in the top and bottom, a wheel within said casing provided with a hollow hub portion, a bearing post extending into said hub portion, a bearing for said wheel located adjacent to the top of said post, said casing having an opening in the bottom thereof for subjecting a portion of the lower face of said hub to a pressure less than the pressure within the wheel casing.

4. In a water meter, a wheel casing provided with peripherally disposed inlet ports, outlet ports and conoidal deflectors arranged adjacent to said outlet ports, a bearing standard located axially of said casing and a wing wheel mounted on said standard and bearing against the top thereof.

5. In a water meter, a wheel casing provided with peripherally disposed inlet ports, outlet ports and conoidal deflectors arranged adjacent to said outlet ports, a bearing standard located axially of said casing and a wing wheel provided with a hub surrounding said standard, an outer casing and means provided with apertures whereby the lower face of said hub is subjected to a pressure less than the pressure within the wheel casing.

6. In a water meter, an outer casing, an inner or wheel casing provided with peripherally disposed inlet ports, annularly disposed outlet ports, retarding devices adjacent to said outlet ports, and deflectors adjacent to said retarding devices, a bearing standard carried by the inner casing, a wing wheel provided with a hollow hub, a bearing for said wing wheel in the top of said standard, an annular flange carried by one of said deflectors surrounding the lower end of said hub and means provided with apertures whereby the lower face of said hub is subjected to a pressure less than the pressure within the wheel casing.

7. In a water meter, an outer casing, an inner casing supported by said outer casing and comprising a flanged cylindrical member provided with peripherally disposed inlet ports, top and bottom members secured to said cylindrical member formed so as to provide outlet ports for the inner casing and deflectors for the outlet water, a bearing post carried by the bottom member and extending into the inner casing, a bearing in the top of said post, a wing wheel located within the inner casing and provided with a hollow hub surrounding said post, an annular flange carried by the bottom member surrounding the lower portion of said hub and means for placing the space bounded by said flange and the outlet of the meter in communication.

In testimony whereof, I have hereunto subscribed my name this 11th day of March, 1908.

HORACE CHRISMAN.

Witnesses:
CHARLES W. MCGHEE,
E. W. MCCALLISTER.